C. GORMLEY.
FERTILIZER DISTRIBUTER.
APPLICATION FILED OCT. 20, 1911.

1,032,132.

Patented July 9, 1912.

Witnesses
Eric Ischinger
Lens M. Ash.

Inventor
Charles Gormley
By Frank Keifer
Attorney

UNITED STATES PATENT OFFICE.

CHARLES GORMLEY, OF MOUNT MORRIS, NEW YORK.

FERTILIZER-DISTRIBUTER.

1,032,132. Specification of Letters Patent. Patented July 9, 1912.

Application filed October 20, 1911. Serial No. 655,740.

*To all whom it may concern:*

Be it known that I, CHARLES GORMLEY, a citizen of the United States, residing at Mount Morris, in the county of Livingston and State of New York, have invented certain new and useful Improvements in Fertilizer-Distributers, of which the following is a specification.

The object of this invention is to provide a distributer for spreading phosphate or other fertilizer on the ground, separate from or in connection with machines for planting seeds.

A further object of this invention is to provide for this by corrugated grinding and distributing rolls.

A further object of this invention is to provide an attachment by which these rolls are kept clean.

Figure 1:
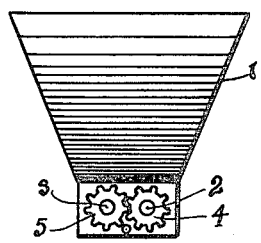
Figure 2:
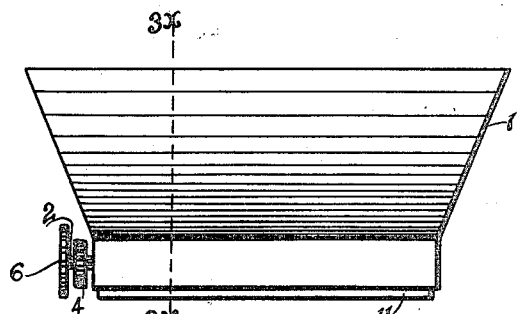
Figure 3:
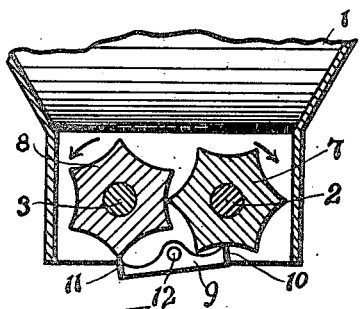
Figure 4:
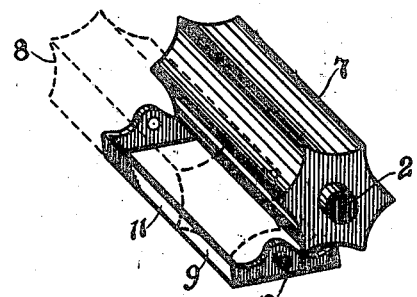
Figure 5:
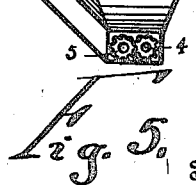

In the accompanying drawings, Figure 1 represents an end elevation of a hopper containing my invention. Fig. 2 is a side elevation of the hopper shown in Fig. 1. Fig. 3 is a cross section through the hopper on the line 3ˣ—3ˣ in Fig. 2. Fig. 4 is a perspective view of the rolls with the cleaning blades shown in connection therewith, the hopper being omitted. Fig. 5 is a perspective view of the hopper which supports the rolls and cleaning blades.

In the accompanying drawings like reference numerals refer to like characters.

1 indicates a hopper of ordinary construction having converging sides, being wide at the top and narrow at the bottom. In this hopper are mounted two shafts 2 and 3, on which shafts are placed pinions 4 and 5, which pinions mesh with each other for the purpose of making the shafts 2 and 3 revolve in unison. The shaft 2 is extended and carries on the end thereof a sprocket wheel 6 which is shown in Fig. 2 and omitted from Figs. 1 and 5. This sprocket may be driven by a sprocket chain, which in turn is driven by a sprocket wheel or gear carried on the draft mechanism of the planter or distributer on which it is carried, this latter not being shown as it constitutes no necessary part of my invention.

On the shafts 2 and 3 are keyed the grinding and distributing rolls 7 and 8, which are corrugated and which are so placed on the shafts with relation to each other that the ridges of one will mesh with the recesses of the other, as is indicated in the cross section in Fig. 3. These rolls are placed at the bottom of the hopper and turn in the direction indicated by the arrow. Pivoted in the frame of the hopper below these rolls is the frame 9 carrying the cleaning blades 10 and 11. These blades are substantially as long as the rolls, and the frame is so pivoted at 12 that when the blade 11 rides on one of the ridges of its roll, the blade 10 will engage with the recess of its roll, and as the rolls revolve the blades will swing back and forth so as to keep fairly close contact with the corrugated surfaces of the rolls for the purpose of scraping them and keeping them clean. These cleaning blades and the mounting thereof is the important feature of my invention.

Having thus described my invention, what I claim as new and patentable is as follows:

1. In a fertilizer distributer, the combination of a pair of corrugated feeding rolls mounted to rotate in mesh with each other, a frame mounted to oscillate below said rolls and carrying the scraping blades that engage with said rolls during the rotation of said rolls.

2. The combination of a hopper, a pair of feeding rolls mounted to rotate therein, a frame pivotally mounted below said rolls and having a pair of scraping blades thereon, each of said scraping blades contacting with one of said rolls.

3. The combination of a hopper, a pair of feeding rolls mounted to rotate therein, a frame pivotally mounted below said rolls and having a pair of scraping blades thereon, each of said scraping blades contacting with one of said rolls, said frame being adapted to be oscillated by the rotation of said rolls.

In testimony whereof I affix my signature in presence of two witnesses.

CHARLES GORMLEY.

Witnesses:
  LOUIS W. J. VOGEL,
  CHAS. W. MINER.